United States Patent
Kuroki

(10) Patent No.: US 10,812,898 B2
(45) Date of Patent: Oct. 20, 2020

(54) SOUND COLLECTION APPARATUS, METHOD OF CONTROLLING SOUND COLLECTION APPARATUS, AND NON-TRANSITORY COMPUTER-READABLE STORAGE MEDIUM

(71) Applicant: CANON KABUSHIKI KAISHA, Tokyo (JP)

(72) Inventor: Tomohiko Kuroki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/447,104

(22) Filed: Jun. 20, 2019

(65) Prior Publication Data
US 2020/0007979 A1 Jan. 2, 2020

(30) Foreign Application Priority Data
Jun. 29, 2018 (JP) .................. 2018-125290

(51) Int. Cl.
| H04R 1/32 | (2006.01) |
| G10L 15/28 | (2013.01) |
| G10L 15/20 | (2006.01) |
| G10L 15/04 | (2013.01) |

(52) U.S. Cl.
CPC .............. *H04R 1/32* (2013.01); *G10L 15/04* (2013.01); *G10L 15/20* (2013.01); *G10L 15/28* (2013.01)

(58) Field of Classification Search
CPC ............ H04S 2400/11; H04S 2420/01; H04S 2400/15; H04S 7/303; H04R 1/1083; H04R 1/326; H04R 1/406; H04R 2460/01; H04R 2203/12; H04R 2410/05; H04R 2430/20; H04R 19/04; H04R 1/32; H04R 1/342; H04R 2410/01; H04R 2430/23; H04R 29/004; G10L 15/04; G10L 15/20; G10L 15/28

USPC ....... 381/56, 303, 58, 73.1, 313, 355, 91, 92

See application file for complete search history.

(56) References Cited

U.S. PATENT DOCUMENTS

| 9,197,974 B1 * | 11/2015 | Clark .................. H04M 9/08 |
| 2005/0149320 A1 * | 7/2005 | Kajala ................ G10L 21/0208 704/206 |
| 2005/0195989 A1 * | 9/2005 | Sato .................. B25J 13/003 381/92 |

FOREIGN PATENT DOCUMENTS

JP 2016046769 A 4/2016

* cited by examiner

*Primary Examiner* — Norman Yu
(74) *Attorney, Agent, or Firm* — Carter, DeLuca & Farrell LLP

(57) ABSTRACT

A sound collection direction is decided based upon an area of an object in a captured image obtained by image capturing of a periphery and a sound collection target position input as a position of a sound collection target. A noise direction is decided based upon an arrangement of the object in the captured image. A sound collected from the periphery is separated into a sound in the sound collection direction and a sound in the noise direction, and noise canceling on the sound in the sound collection direction is performed using the sound in the noise direction.

6 Claims, 6 Drawing Sheets

SOUND COLLECTION APPARATUS, METHOD OF CONTROLLING SOUND COLLECTION APPARATUS, AND NON-TRANSITORY COMPUTER-READABLE STORAGE MEDIUM

BACKGROUND OF THE INVENTION

Field of the Invention

The present invention relates to sound collection technology.

Description of the Related Art

A voice recognition function is an essential function in car navigation systems, smart speakers, and the like. To improve a recognition rate in the voice recognition, there is a beam forming technology in which a sound source in a designated direction is separated using a microphone array equipped with a plurality of microphones and a target sound is obtained. However, the beam forming technology has a problem that it is not possible to precisely extract the target sound under an environment with a noisy environmental sound as a whole.

In the conventional technology, the environmental sound is obtained as a noise sound, and the noise sound is canceled from the separated target sound using a spectral subtraction method or the like to precisely extract the target sound. Japanese Patent Laid-Open No. 2016-46769 discloses a method for precisely extracting a target sound in which a sound in an opposite direction to a target direction is obtained through beam forming, and the sound is canceled from the sound in the target direction.

However, in the conventional technology described above, in a case where a sound that is close to the target sound enters the noise sound to be canceled, the target sound is also canceled, and thus, on the contrary, the extraction precision may drop in some cases. For example, when obtaining a conversation voice of a human in a designated direction, in a case where there is a human who is making conversation in an opposite direction as well, since the human voice enters a noise sound to be canceled, the conversation voice of the human in the designated direction is also canceled, and thus the extraction precision may drop. Also, in a case where there is no noise source in the opposite direction, there is a problem in that the effect of the canceling processing cannot be sufficiently exhibited.

SUMMARY OF THE INVENTION

The present invention provides technology for obtaining a target sound with higher accuracy from sounds which are collected.

According to the first aspect of the present invention, there is provided a sound collection apparatus comprising: a first decision unit configured to decide a sound collection direction based upon an area of an object in a captured image obtained by image capturing of a periphery and a sound collection target position input as a position of a sound collection target; a second decision unit configured to decide a noise direction based upon an arrangement of the object in the captured image; and a noise canceling unit configured to separate a sound collected from the periphery into a sound in the sound collection direction and a sound in the noise direction, and perform noise canceling on the sound in the sound collection direction using the sound in the noise direction.

According to the second aspect of the present invention, there is provided a method of controlling a sound collection apparatus, the method comprising: deciding a sound collection direction based upon an area of an object in a captured image obtained by image capturing of a periphery and a sound collection target position input as a position of a sound collection target; deciding a noise direction based upon an arrangement of the object in the captured image; and separating a sound collected from the periphery into a sound in the sound collection direction and a sound in the noise direction, and performing noise canceling on the sound in the sound collection direction using the sound in the noise direction.

According to the third aspect of the present invention, there is provided a non-transitory computer-readable storage medium storing a computer program for causing a computer to function as: a first decision unit configured to decide a sound collection direction based upon an area of an object in a captured image obtained by image capturing of a periphery and a sound collection target position input as a position of a sound collection target; a second decision unit configured to decide a noise direction based upon an arrangement of the object in the captured image; and a noise canceling unit configured to separate a sound collected from the periphery into a sound in the sound collection direction and a sound in the noise direction, and perform noise canceling on the sound in the sound collection direction using the sound in the noise direction.

Further features of the present invention will become apparent from the following description of exemplary embodiments (with reference to the attached drawings).

DESCRIPTION OF THE EMBODIMENTS

Embodiments of the invention are described below with reference to the accompanying drawings. Note that the embodiments to be described below represent an example of a specific implementation of the present invention, which is one of the specific embodiments of the configurations described in the claims.

First Embodiment

First, a functional configuration example of a voice recognition system according to the present embodiment will be described with reference to a block diagram of FIG. 1. A voice recognition system A1000 according to the present embodiment is a system configured to recognize a speech content from a voice spoken by a human and display a result of the recognition.

Figure 1:
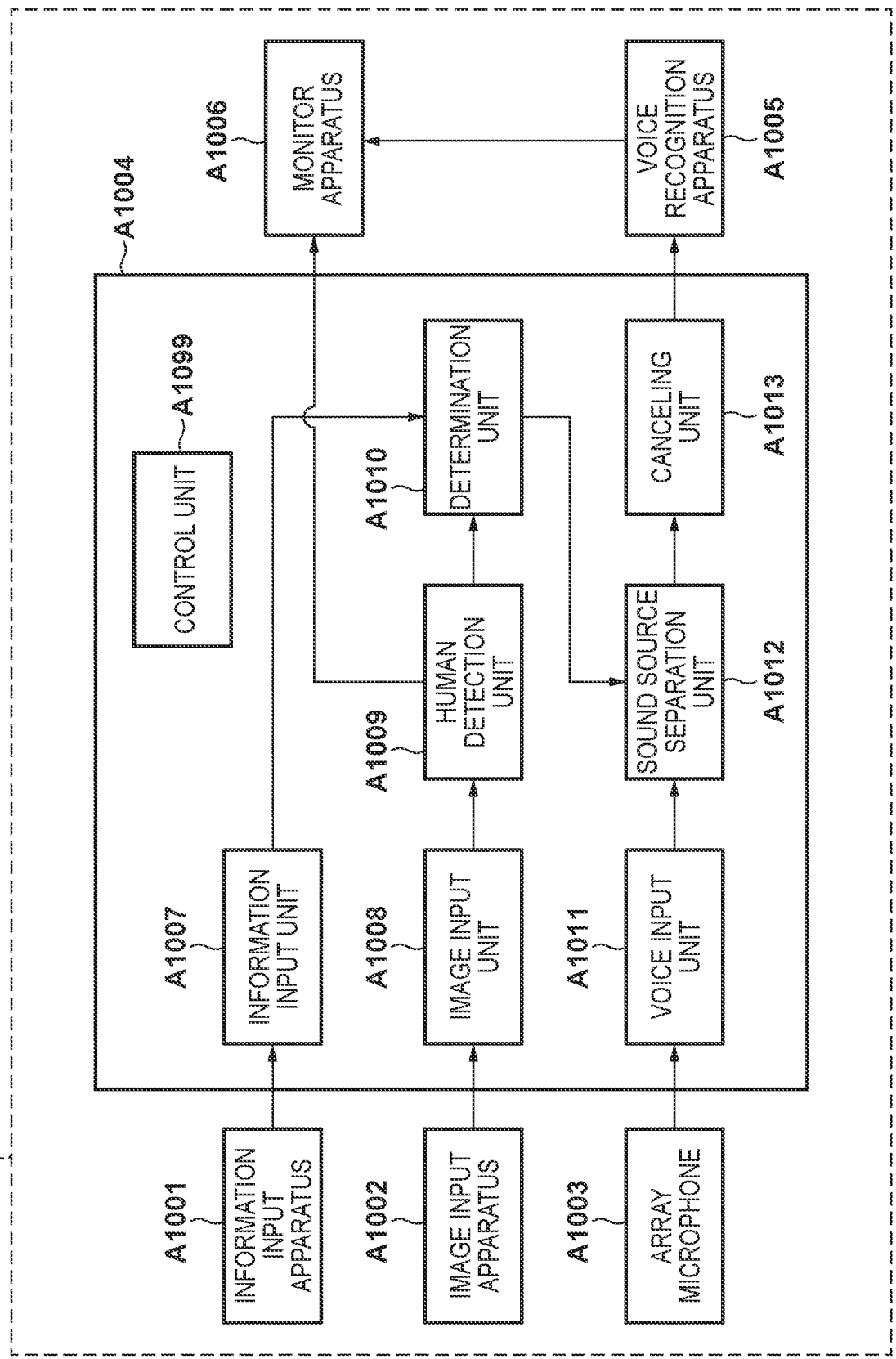
FIG. 1 is a block diagram illustrating a functional configuration example of a voice recognition system.

As illustrated in FIG. 1, the voice recognition system A1000 according to the present embodiment includes an information input apparatus A1001, an image input apparatus A1002, an array microphone A1003, a sound collection apparatus A1004, a voice recognition apparatus A1005, and a monitor apparatus A1006. The sound collection apparatus A1004 and the voice recognition apparatus A1005 are connected via an audio interface, and the sound collection apparatus A1004 and the monitor apparatus A1006 are connected via a video interface. However, the connection configuration between the apparatuses is not limited to a particular connection configuration.

First, the information input apparatus A1001 will be described. The information input apparatus A1001 is an apparatus to which information (sound collection target information) related to a sound collection target (sound acquisition target) can be input by being operated by a user, and a device such as a mouse, a keyboard, a touch panel screen, a smartphone, a tablet terminal device, or the like is applicable thereto. In the present embodiment, the sound collection target information includes a position of the sound collection target (sound collection target position). The information input apparatus A1001 outputs the sound collection target information input by the user to the sound collection apparatus A1004.

Next, the image input apparatus A1002 will be described. The image input apparatus A1002 is an apparatus capable of capturing an image of the periphery of itself. The image input apparatus A1002 may be an image capturing apparatus that captures a panoramic image of the periphery, or may be a plurality of image capturing apparatuses that acquires a captured image of the periphery by respectively capturing images in different directions. The image input apparatus A1002 outputs the captured image obtained by image capturing of the periphery of itself to the sound collection apparatus A1004.

Next, the array microphone A1003 will be described. The array microphone A1003 is an apparatus that collects sounds of the periphery of itself with a plurality of microphones and simultaneously generates pieces of voice information of a plurality of channels, and outputs the pieces of voice information of the plurality of channels to the sound collection apparatus A1004.

Next, the sound collection apparatus A1004 will be described. The sound collection apparatus A1004 is a computer apparatus such as a personal computer (PC), a smartphone, a tablet terminal device, or the like. A control unit A1099 controls an operation of the sound collection apparatus A1004.

An information input unit A1007 obtains the sound collection target information output from the information input apparatus A1001, and outputs the obtained sound collection target information to a determination unit A1010 in a subsequent stage. An image input unit A1008 obtains the captured image output from the image input apparatus A1002, and outputs the obtained captured image to a human detection unit A1009 in a subsequent stage. A voice input unit A1011 obtains the pieces of voice information of the plurality of channels output from the array microphone A1003, and outputs the obtained pieces of voice information of the plurality of channels to a sound source separation unit A1012 in a subsequent stage.

The human detection unit A1009 detects a human body from the captured image output from the image input unit A1008. There are various technologies as a technology for detecting a human body from an image, such as a template matching method or the like, and in the present embodiment, human detection from images may be performed using any technology. The human detection unit A1009 outputs the captured image output from the image input unit A1008 to the monitor apparatus A1006, and outputs the detection result of the human body detected from the captured image to the determination unit A1010 in a subsequent stage. In the present embodiment, the detection result of the human body includes human area information (for example, image coordinates of an upper left corner and an upper right corner of the human area) that defines an image area (human area) of the human body detected from the captured image.

The determination unit A1010 obtains a position of the sound collection target included in the sound collection target information from the information input unit A1007 and the human area defined by the human area information included in the detection result of the human body from the human detection unit A1009, and decides a sound collection direction and a noise direction. In a case where there is the human body in a direction from the array microphone A1003 to "the position of the sound collection target included in the sound collection target information", the determination unit A1010 takes the direction to the human body as the sound collection direction. Additionally, the determination unit A1010 takes a direction in which there is no human body from the array microphone A1003 as the noise direction.

Figure 3:
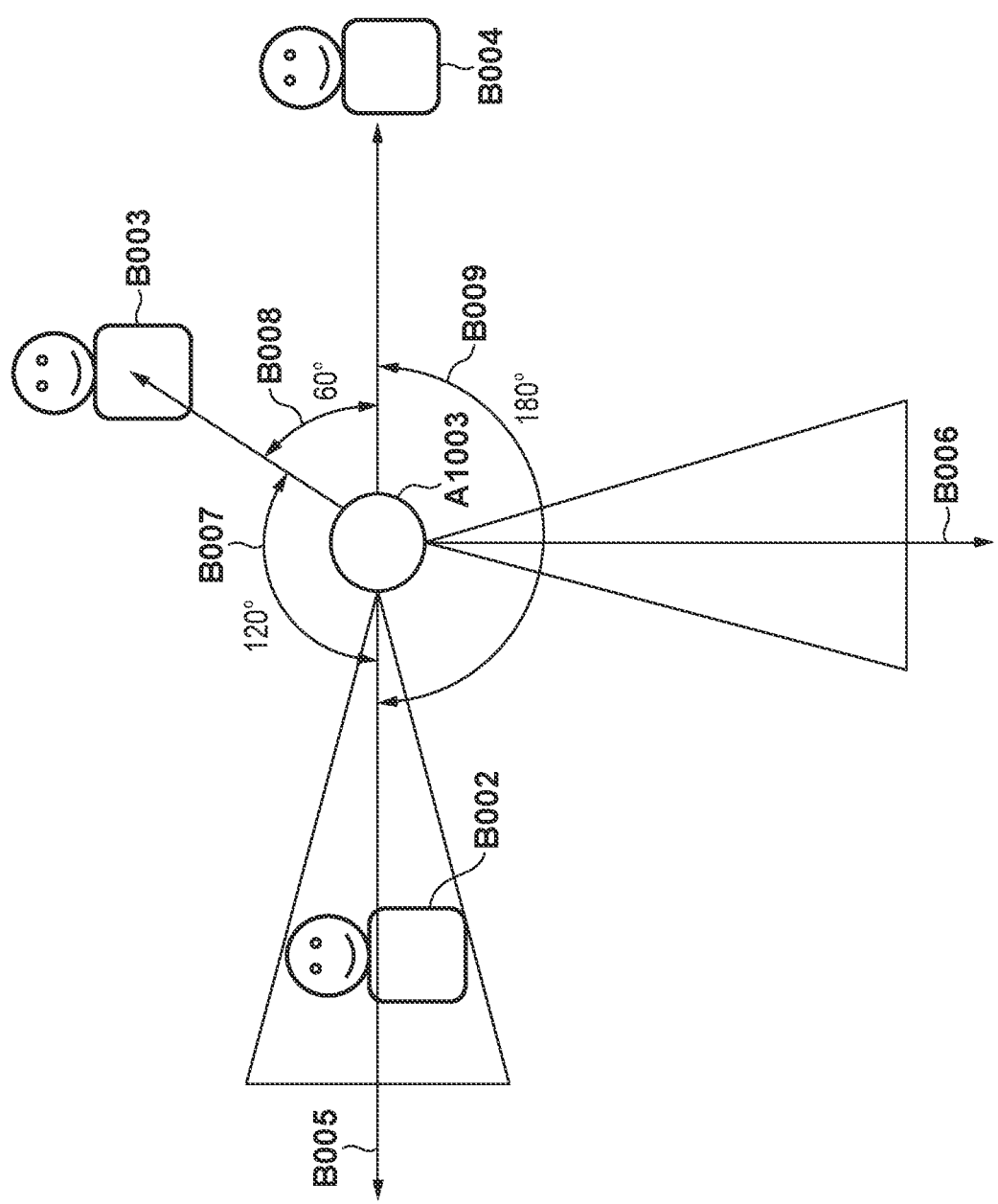
FIG. 3 is a diagram illustrating an example of a method of deciding a sound collection direction and a noise direction.

A method of deciding the sound collection direction and the noise direction by the determination unit A1010 is described in more detail with reference to FIG. 3 as an example. The human bodies B002, B003, and B004 are human bodies detected from the captured image.

First, a method of deciding the sound collection direction will be described. The determination unit A1010 obtains a direction B005 from the array microphone A1003 to "the position of the sound collection target included in the sound collection target information", determines whether a human body is present in the direction B005, and in a case where the human body is present, takes the direction to the human body as the sound collection direction. In FIG. 3, since the human body B002 is present in the direction B005 from the array microphone A1003, the direction from the array microphone A1003 to the human body B002 is taken as the sound collection direction.

For determining whether the human body is present in the direction B005, for example, image coordinates corresponding to the direction B005 in the captured image are obtained and whether a human area including the image coordinates is present among human areas in the captured image is determined. A correspondence relationship between the direction from the array microphone A1003 and the image coordinates corresponding to the direction in the captured image is assumed to be known. In the case of FIG. 3, the human bodies B002, B003, and B004 are detected from the captured image. Accordingly, in this case, among the respective human areas of the human bodies B002, B003, and B004, it is to be determined whether a human area that includes the image coordinates corresponding to the direction B005 therein is present in the captured image. As a result of this determination, in a case where the human area including the image coordinates corresponding to the direction B005 is present, it is determined that "the human body is present in the direction B005". On the other hand, in a case where the human area including the image coordinates corresponding to the direction B005 is not present, it is determined that "the human body is not present in the direction B005".

Next, a method of deciding the noise direction will be described. The determination unit A1010 obtains an arrangement distance between the human bodies. In the example of FIG. 3, an arrangement distance B007 between the human body B002 and the human body B003 is 120°, an arrangement distance B008 between the human body B003 and the human body B004 is 60°, and an arrangement distance B009 between the human body B004 and the human body B002 is 180°. For example, in a case where the captured image is a panoramic image (a horizontal direction of the captured image corresponds to an azimuth direction), the number of pixels in the horizontal direction of the panoramic image is taken as W, and a distance (the number of pixels) between a human body A (human area) and a human body B (human area) in the horizontal direction in the panoramic image is taken as w. At this time, the arrangement distance between the human body A and the human body B can be calculated as 180×w/W(°). Note that the arrangement distance is not limited to being expressed with an angle. Then, the determination unit A1010 identifies the largest arrangement distance among the arrangement distances B007, B008, and B009, and takes the center direction of the identified arrangement distance as the noise direction. In the case of FIG. 3, because of the arrangement distance B007=120°, the arrangement distance B008=60°, and the arrangement distance B009=180°, a center direction B006 of the largest arrangement distance B009 is taken as the noise direction. Then, the determination unit A1010 outputs the sound collection direction and the noise direction decided as described above to the sound source separation unit A1012.

The sound source separation unit A1012 performs beam forming processing for separating a sound source in the sound collection direction and a sound source in the noise direction from the pieces of voice information of the plurality of channels output from the voice input unit A1011, thereby obtaining a target sound that is a sound in the sound collection direction and a noise sound that is a sound in the noise direction. Then, the sound source separation unit A1012 outputs the target sound and the noise sound to a canceling unit A1013 in a subsequent stage.

In order to cancel the noise sound from the target sound using the spectral subtraction method, the canceling unit A1013 achieves noise canceling processing by canceling the noise sound from the target sound using the spectral subtraction method. The canceling unit A1013 outputs the target sound on which the noise canceling processing is performed to the voice recognition apparatus A1005.

Next, the voice recognition apparatus A1005 will be described. The voice recognition apparatus A1005 performs voice recognition based upon "the target sound on which the noise canceling processing is performed" outputted from the canceling unit A1013, and outputs a result of the voice recognition to the monitor apparatus A1006.

Next, the monitor apparatus A1006 will be described. The monitor apparatus A1006 is a display apparatus such as a liquid crystal screen, a touch panel screen, a projector apparatus, or the like, and displays the captured image output from the human detection unit A1009 and the result of the voice recognition output from the voice recognition apparatus A1005. A display form of the captured image and the result of the voice recognition is not limited to a particular display form, the result of the voice recognition may be displayed by being overlapped on the captured image, or the both may be displayed in separate display areas.

Figure 2:
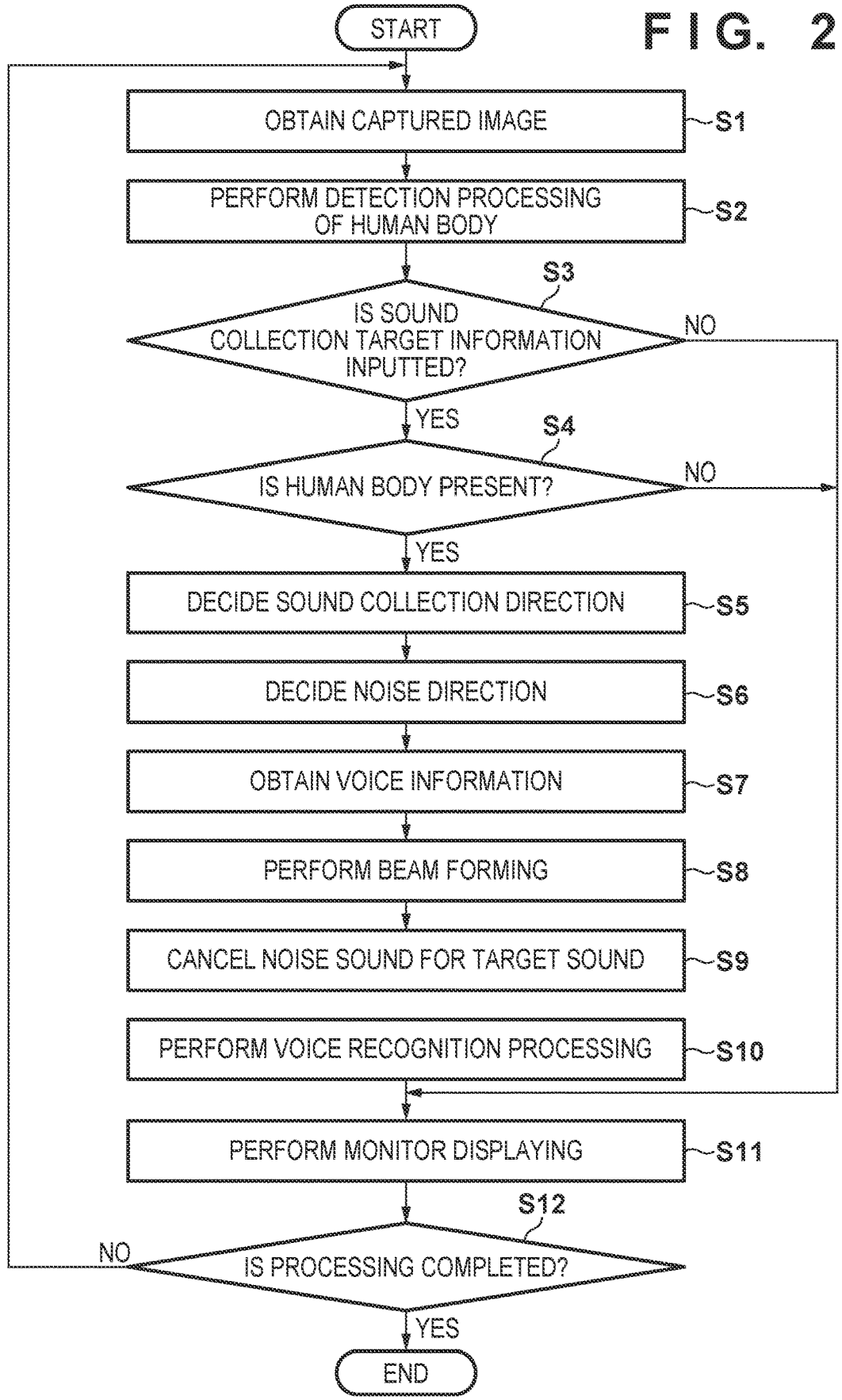
FIG. 2 is a flowchart of operations of a voice recognition system A1000.

Operations of the voice recognition system A1000 described above will be described in accordance with the flowchart of FIG. 2. Note that the details of the processing in each step in FIG. 2 are as described above, and thus brief description will be given here. The voice recognition system A1000 starts the voice recognition processing when activated by a user operation and performs processing in accordance with the flowchart of FIG. 2.

In step S1, the image input unit A1008 acquires the captured image output from the image input apparatus A1002. In step S2, the human detection unit A1009 detects the human body from the captured image output from the image input unit A1008.

In step S3, the information input unit A1007 determines whether the sound collection target information has been obtained from the information input apparatus A1001, in a case where the information has not been obtained, the processing proceeds to step S11, and in a case where the information has been obtained, the processing proceeds to step S4.

In step S4, the human detection unit A1009 determines whether a plurality of human bodies is present in the captured image, that is, whether a plurality of human bodies has been detected from the captured image in step S2. As a result of this determination, in a case where the plurality of human bodies is present in the captured image (the plurality of human bodies has been detected from the captured images in step S2), the processing proceeds to step S5. On the other hand, in a case where the plurality of human bodies is not present in the captured image (the plurality of human bodies has not been detected from the captured images in step S2), the processing proceeds to step S11.

In step S5, the determination unit A1010 decides the sound collection direction based upon the position of the sound collection target included in the sound collection target information obtained by the information input unit A1007 and the human area included in the detection result of the human body by the human detection unit A1009. In step S6, the determination unit A1010 decides the noise direction based upon the arrangement distance between the human areas included in the detection result of the human body by the human detection unit A1009.

In step S7, the voice input unit A1011 obtains the pieces of voice information of the plurality of channels output from the array microphone A1003. In step S8, the sound source separation unit A1012 performs beam forming processing for separating a sound source in the sound collection direction and a sound source in the noise direction from the pieces of voice information of the plurality of channels, thereby obtaining the target sound that is a sound in the sound collection direction and the noise sound that is a sound in the noise direction.

In step S9, the canceling unit A1013 cancels the noise sound using the spectral subtraction method for the target sound, thereby achieving the noise canceling processing. In step S10, the voice recognition apparatus A1005 performs the voice recognition based upon the target sound on which the noise canceling processing is performed in step S9. In step S11, the monitor apparatus A1006 displays the captured image obtained in step S1 and the result of the voice recognition in step S10.

In step S12, the control unit A1099 determines whether a stop condition of the voice recognition system A1000 has been satisfied, such as an On/Off switch, which is not illustrated, of the voice recognition system A1000 being operated by a user to perform a stop operation of the voice recognition system A1000. As a result of this determination, in a case where the stop condition is satisfied, the processing in accordance with the flowchart of FIG. 2 is completed, and in a case where the stop condition is not satisfied, the processing proceeds to step S1.

In this manner, in the present embodiment, by determining the direction in which there is no human body from the captured image obtained by image capturing of the periphery and canceling the sound in the direction from the target sound as the noise source, it is possible to precisely extract the target sound.

Modification Example

In the first embodiment, the captured image and the result of the voice recognition are displayed, but the output form of the captured image and the result of the voice recognition is not limited to a particular output form. For example, the captured image and the result of the voice recognition may be transmitted to an external apparatus via a network, or the captured image and the result of the voice recognition may be stored in an internal memory or an external memory of the voice recognition system A1000.

Additionally, in FIG. 1, the information input apparatus A1001, the image input apparatus A1002, the array microphone A1003, the sound collection apparatus A1004, the voice recognition apparatus A1005, and the monitor apparatus A1006 have been described as separate apparatuses. However, two or more of these apparatuses may be grouped together in a single apparatus. Additionally, a function of each of these apparatuses may be distributed to two or more apparatuses.

Furthermore, the technology for separating the sound in the sound collection direction and the sound in the noise direction by the sound source separation unit A1012 is not limited to the beam forming processing described above, and the noise canceling technology is not also limited to the spectral subtraction method.

Second Embodiment

Hereinafter, differences from the first embodiment will be described, and unless particularly stated below, the description given in the first embodiment will apply. A functional configuration example of a voice recognition system according to the present embodiment will be described with reference to a block diagram of FIG. 4.

A voice recognition system B1000 according to the present embodiment includes a sound collection apparatus B1004 instead of the sound collection apparatus A1004 described above. Additionally, the sound collection apparatus B1004 is an apparatus in which the control unit A1099, the human detection unit A1009, and the determination unit A1010 are replaced with a control unit B1099, a detection unit B1009, and a determination unit B1010, respectively, in the sound collection apparatus A1004 described above.

The detection unit B1009 detects a human body from the captured image output from the image input unit A1008 in the same manner as with the first embodiment. Furthermore, the detection unit B1009 detects, from the captured image output from the image input unit A1008, an object (television set, speaker, animal, vehicle body, fan, or the like), which is specified beforehand as an object that may be a noise source, as a noise object. For a detection method of the noise object from the captured image, the same method as the detection method of the human body is used, but the detection method may be changed between the human body and the noise object. Also, different detection methods may be adopted depending on a type of the noise object.

The detection unit B1009 outputs the captured image output from the image input unit A1008 to the monitor apparatus A1006, and outputs the detection result of the human body and the detection result of the noise object to the determination unit B1010 in a subsequent stage. In the present embodiment, the detection result of the human body includes human area information (for example, image coordinates of an upper left corner and an upper right corner of the human area) that defines an image area (human area) of the human body detected from the captured image. Furthermore, the detection result of the noise object includes noise object area information (for example, image coordinates of an upper left corner and an upper right corner of the noise object area) that defines an image area (noise object area) of the noise object detected from the captured image.

The determination unit B1010 decides the sound collection direction and the noise direction, but decides the sound collection direction in the same manner as with the first embodiment. The noise direction is decided as follows. That is, in a case where the noise object is detected from the captured image, the determination unit B1010 takes a direction corresponding to a position of the noise object area of the noise object in the captured image as the noise direction. "The position of the noise object area" is, for example, the center position of the noise object area or a position of any of the four corners of the noise object area. On the other hand, in a case where no noise object is detected from the captured image, the determination unit B1010 takes an opposite direction to the sound collection direction as the noise direction.

Figure 5:
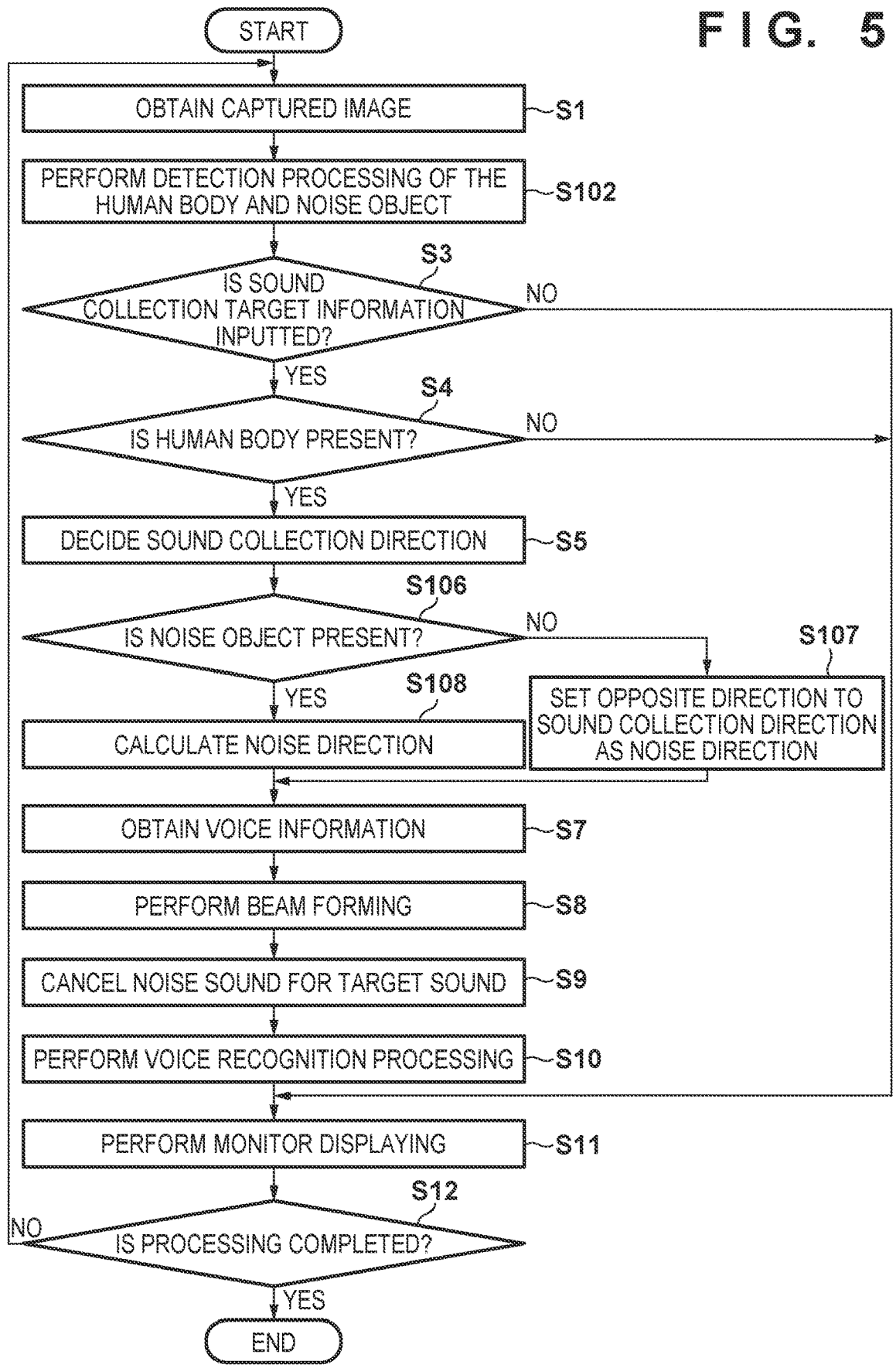
FIG. 5 is a flowchart of operations of a voice recognition system B1000.

Operations of the voice recognition system B1000 according to the present embodiment will be described in accordance with the flowchart of FIG. 5. Note that in FIG. 5, processing steps that are the same as the processing steps illustrated in FIG. 2 are denoted by the same processing step numbers, and description related to the processing steps will be omitted.

In step S102, the detection unit B1009 detects the human body and the noise object from the captured image obtained in step S1. In step S106, the detection unit B1009 determines whether the noise object has been detected from the captured image. As a result of this determination, in a case where the noise object has been detected from the captured image, the processing proceeds to step S108, and in a case where no noise object has been detected from the captured image, the processing proceeds to step S107.

In step S107, the determination unit B1010 takes the opposite direction to the sound collection direction as the noise direction. On the other hand, in step S108, the determination unit B1010 takes a direction corresponding to the position of the noise object area in the captured image as the noise direction.

In this way, in the present embodiment, by determining the direction of the noise source from the captured image and canceling the sound in the direction from the target sound as the noise source, it is possible to precisely extract the target sound.

Modification Example

Figure 4:
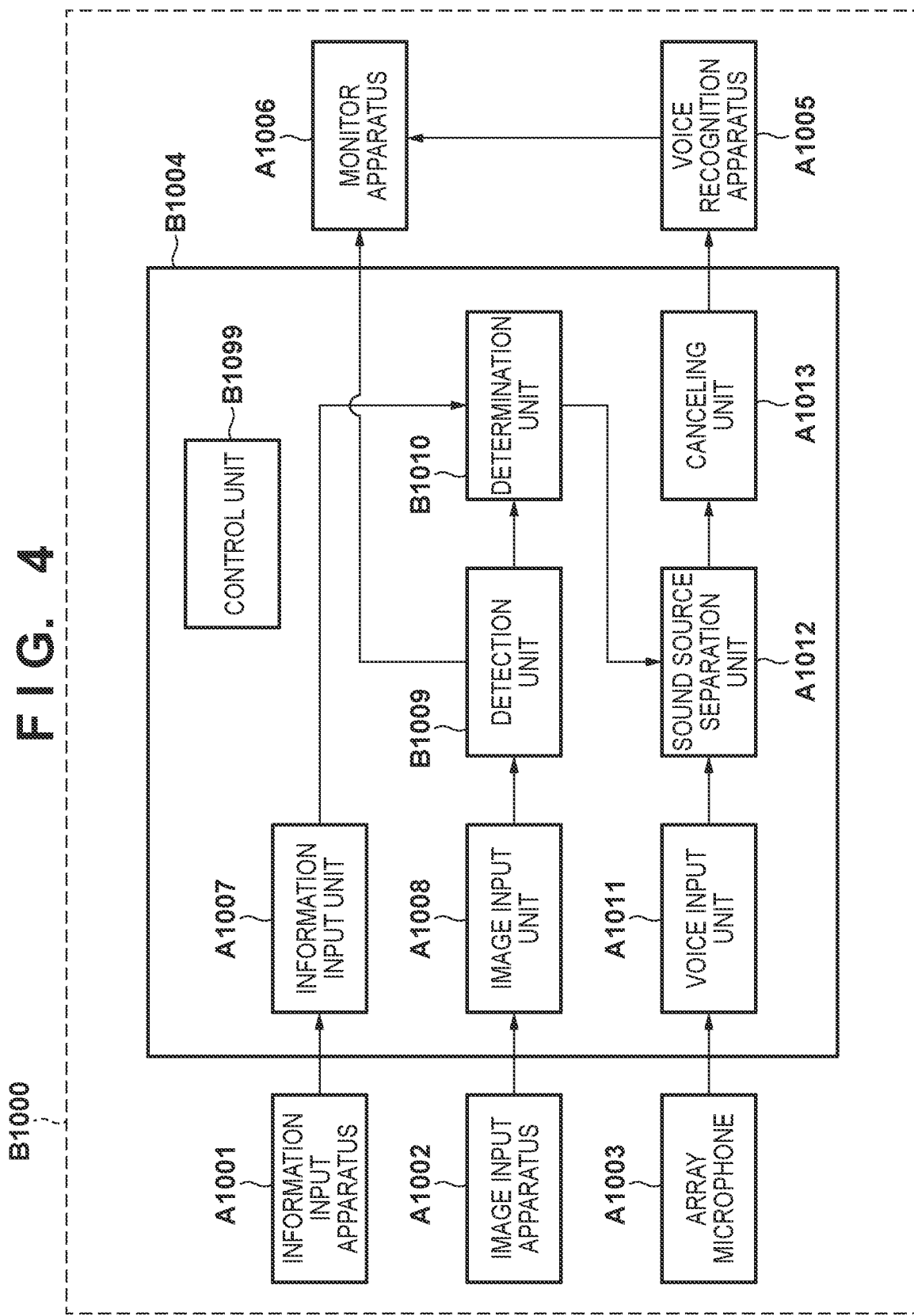
FIG. 4 is a block diagram illustrating a functional configuration example of a voice recognition system.

In FIG. 4, the information input apparatus A1001, the image input apparatus A1002, the array microphone A1003, the sound collection apparatus B1004, the voice recognition apparatus A1005, and the monitor apparatus A1006 have been described as separate apparatuses. However, two or more of these apparatuses may be grouped together in a single apparatus. Additionally, a function of each of these apparatuses may be distributed to two or more apparatuses.

Third Embodiment

To the sound collection apparatus A1004 according to the first embodiment, a detection unit configured to detect motion of lips of a human from the captured image and detect whether the human is speaking may be added, and a direction corresponding to a position where there is no human who is speaking in the captured image may be used as the noise direction.

Additionally, to the sound collection apparatus B1004 according to the second embodiment, an estimation unit configured to detect motion of the object from the captured image and estimate whether a sound is emitted therefrom may be added. A direction corresponding to a position of the object in the captured image in a case where the object emitting the sound is present, or an opposite direction to the sound collection direction in a case where no object emitting the sound is present, may be used as the noise direction. Also, in the first to third embodiments, the "human body" is only one example of an object to be detected, and other types of objects may be targeted.

Fourth Embodiment

The functional units illustrated in FIG. 1 as units which are included in the sound collection apparatus A1004 and the functional units illustrated in FIG. 4 as units which are included in the sound collection apparatus B1004 may be implemented in hardware, or may be implemented in software (computer program). In the latter case, a computer apparatus capable of executing this computer program is applicable to the sound collection apparatus A1004 and the sound collection apparatus B1004. A hardware configuration example of the computer apparatus applicable to the sound collection apparatus A1004 and the sound collection apparatus B1004 will be described using the block diagram of FIG. 6.

A CPU 601 is configured to execute various types of processing using computer programs and data stored in a RAM 602 and a ROM 603. This allows the CPU 601 to control the overall operations of the computer apparatus, as well as to perform or control various types of processing described above as being executed by the sound collection apparatus A1004 and the sound collection apparatus B1004.

The RAM 602 includes an area for storing computer programs and data loaded from the ROM 603 or an external storage unit 604, and data received from an external component via an interface (I/F) 605. The RAM 602 also includes a work area that the CPU 601 uses in executing various types of processing. In this way, the RAM 602 can provide various types of areas as appropriate. The ROM 603 is configured to store non-rewritable information such as setting data, startup programs, or the like for the computer apparatus.

The external storage unit 604 is a large-capacity information storage unit represented by a hard disk drive. The external storage unit 604 is configured to store an operating system (OS), and data and computer programs that cause the CPU 601 to execute or control various types of processing described above as being executed by the sound collection apparatus A1004 and the sound collection apparatus B1004.

The computer program stored in the external storage unit 604 includes computer programs configured to cause the CPU 601 to achieve the function of each of the functional units of the sound collection apparatus A1004 illustrated in FIG. 1 or the function of each of the functional units of the sound collection apparatus B1004 illustrated in FIG. 4. The data stored in the external storage unit 604 also includes information handled by the sound collection apparatus A1004 and the sound collection apparatus B1004 as known information in the above description.

The computer programs and data stored in the external storage unit 604 are loaded into the RAM 602 as appropriate in accordance with the control of the CPU 601, and are then to be processed by the CPU 601.

The I/F 605 has a plurality of types of interfaces for performing data communication with external devices. To the I/F 605, for example, the information input apparatus A1001, the image input unit A1008, the array microphone A1003, the voice recognition apparatus A1005, and the monitor apparatus A1006 are connected.

The CPU 601, the RAM 602, the ROM 603, the external storage unit 604, and the I/F 605 are all connected to a bus 606. Note that the configuration illustrated in FIG. 6 is only one example of the hardware configuration of the computer apparatus applicable to the sound collection apparatus A1004 and the sound collection apparatus B1004 described above, and can be changed/deformed as appropriate.

Figure 6:
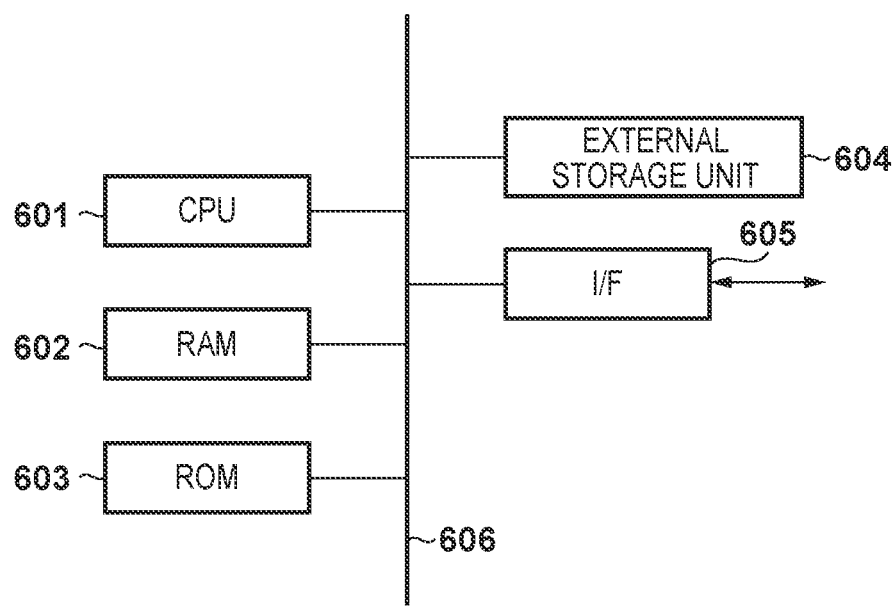
FIG. 6 is a block diagram illustrating an example of a hardware configuration of a computer apparatus.

The configuration illustrated in FIG. 6 is also applicable to the information input apparatus A1001, the image input apparatus A1002, and the voice recognition apparatus A1005. In this case, depending on the apparatus to be applied, a device may be added or deleted as appropriate to or from the configuration of FIG. 6. For example, in a case where the computer apparatus of FIG. 6 is applied to the information input apparatus A1001, the computer apparatus needs to be newly provided with an operation unit (keyboard, mouse, touch panel screen, or the like) operated by a user to input the sound collection target information and the like.

Also, the voice recognition apparatus A1005 may be implemented as software. In this case, the software is stored in the external storage unit 604 and executed by the CPU 601.

Note that some or all of the embodiments and modification examples described above may be used in combination as appropriate. Further, some or all of the embodiments and modification examples described above may be used in a selective manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125290, filed Jun. 29, 2018, which is hereby incorporated by reference herein in its entirety.

What is claimed is:

1. A sound collection apparatus comprising:
at least one circuitry configured to:
    decide a sound collection direction based upon an area of an object in a captured image obtained by image capturing of a periphery and a sound collection target position input as a position of a sound collection target;
    decide a noise direction based upon an arrangement of the object in the captured image; and
    separate a sound collected from the periphery into a sound in the sound collection direction and a sound in the noise direction, and perform noise canceling on the sound in the sound collection direction using the sound in the noise direction,
wherein a direction corresponding to an area, in the captured image, of an object designated in advance as an object capable of being a noise source, is decided as the noise direction, and
wherein, in a case where the object designated in advance as the object capable of being the noise source is not detected from the captured image, an opposite direction to the sound collection direction is decided as the noise direction.

2. The sound collection apparatus according to claim 1, wherein the sound collection direction is decided based upon a position in the captured image corresponding to a direction to the sound collection target position and the area of the object in the captured image.

3. The sound collection apparatus according to claim 1, wherein the at least one circuitry is further configured to:
perform voice recognition based upon a sound on which the noise canceling is performed.

4. The sound collection apparatus according to claim 3, wherein the at least one circuitry is further configured to:
    output the captured image and a result of the voice recognition.

5. A method of controlling a sound collection apparatus, the method comprising:
    deciding a sound collection direction based upon an area of an object in a captured image obtained by image capturing of a periphery and a sound collection target position input as a position of a sound collection target;
    deciding a noise direction based upon an arrangement of the object in the captured image; and
    separating a sound collected from the periphery into a sound in the sound collection direction and a sound in the noise direction, and performing noise canceling on the sound in the sound collection direction using the sound in the noise direction,
wherein a direction corresponding to an area, in the captured image, of an object designated in advance as an object capable of being a noise source, is decided as the noise direction, and
wherein, in a case where the object designated in advance as the object capable of being the noise source is not detected from the captured image, an opposite direction to the sound collection direction is decided as the noise direction.

6. A non-transitory computer-readable storage medium storing a computer program for causing a computer to:
    decide a sound collection direction based upon an area of an object in a captured image obtained by image capturing of a periphery and a sound collection target position input as a position of a sound collection target;
    decide a noise direction based upon an arrangement of the object in the captured image; and
    separate a sound collected from the periphery into a sound in the sound collection direction and a sound in the noise direction, and perform noise canceling on the sound in the sound collection direction using the sound in the noise direction,
wherein a direction corresponding to an area, in the captured image, of an object designated in advance as an object capable of being a noise source, is decided as the noise direction, and
wherein, in a case where the object designated in advance as the object capable of being the noise source is not detected from the captured image, an opposite direction to the sound collection direction is decided as the noise direction.

* * * * *